(12) United States Patent
Pfeiffer et al.

(10) Patent No.: US 9,393,911 B2
(45) Date of Patent: Jul. 19, 2016

(54) ROOF RACK FOR A MOTOR VEHICLE, AND A METHOD FOR OPERATING A CONTROLLER OF A MOTOR VEHICLE AND A CORRESPONDING CONTROLLER

(71) Applicant: Audi AG, Ingolstadt (DE)

(72) Inventors: Ulrich Pfeiffer, Karlskron/Probfeld (DE); Felix Ballweg, Ingolstadt (DE); Wolfgang Schmid, Freising (DE)

(73) Assignee: AUDI AG, Ingolstadt (DE)

( * ) Notice: Subject to any disclaimer, the term of this patent is extended or adjusted under 35 U.S.C. 154(b) by 399 days.

(21) Appl. No.: 13/950,073

(22) Filed: Jul. 24, 2013

(65) Prior Publication Data

US 2014/0028007 A1   Jan. 30, 2014

(30) Foreign Application Priority Data

Jul. 25, 2012 (DE) .......................... 10 2012 014 696

(51) Int. Cl.
*B60R 9/04* (2006.01)
*B60R 9/058* (2006.01)

(52) U.S. Cl.
CPC .. *B60R 9/058* (2013.01); *B60R 9/04* (2013.01)

(58) Field of Classification Search
CPC .............. B60R 9/058; B60R 9/06; B60R 9/08
See application file for complete search history.

(56) References Cited

U.S. PATENT DOCUMENTS

| | | | | |
|---|---|---|---|---|
| 3,334,197 A * | 8/1967 | Boden | ...................... | B66C 13/12 138/106 |
| 4,911,348 A * | 3/1990 | Rasor | ...................... | B60R 9/045 211/94.01 |
| 5,423,466 A * | 6/1995 | Moon | ...................... | B60R 9/12 224/309 |
| 5,516,019 A * | 5/1996 | Moon | ...................... | B60R 9/12 224/309 |
| 5,730,343 A * | 3/1998 | Settelmayer | ............ | B60R 9/045 224/321 |
| 5,769,291 A * | 6/1998 | Chasan | ..................... | B60R 9/08 224/318 |
| 5,845,829 A * | 12/1998 | Stapleton | ................ | B60R 9/045 224/321 |
| 5,984,155 A * | 11/1999 | Stapleton | ................ | B60R 9/045 224/321 |
| 6,851,695 B2 * | 2/2005 | Lindenman | ............ | B60D 1/015 248/231.9 |
| 2005/0051585 A1* | 3/2005 | Kamiya | .................. | B60R 9/045 224/321 |
| 2011/0297713 A1* | 12/2011 | Gisin | ........................ | B60R 9/04 224/327 |
| 2014/0028007 A1* | 1/2014 | Pfeiffer | ..................... | B60R 9/04 280/769 |

FOREIGN PATENT DOCUMENTS

| | | |
|---|---|---|
| DE | 100 23 526 | 11/2001 |
| DE | 102004031224 | 1/2006 |
| EP | 0 827 870 | 3/1998 |
| WO | WO 9320601 | 10/1993 |

* cited by examiner

*Primary Examiner* — Brian D Nash
(74) *Attorney, Agent, or Firm* — Henry M. Feiereisen LLC

(57) ABSTRACT

A roof rack assembly for a motor vehicle includes roof rails having a recess and constructed to be fastened on a vehicle roof of the motor vehicle. A load carrier to be installed on the roof rails has a mounting projection engaging with the roof rails through the recess when the load carrier is installed and cooperating with a mounting receptacle for retaining the load carrier. The recess is closed by a cover when the load carrier is not installed, with a detection device detecting a cover state of the recess. A method for operating a controller of a motor vehicle and a corresponding controller are also described.

12 Claims, 4 Drawing Sheets

ROOF RACK FOR A MOTOR VEHICLE, AND A METHOD FOR OPERATING A CONTROLLER OF A MOTOR VEHICLE AND A CORRESPONDING CONTROLLER

CROSS-REFERENCES TO RELATED APPLICATIONS

This application claims the priority of German Patent Application, Serial No. 10 2012 014 696.5, filed Jul. 25, 2012, pursuant to 35 U.S.C. 119(a)-(d), the content of which is incorporated herein by reference in its entirety as if fully set forth herein.

BACKGROUND OF THE INVENTION

The present invention relates to a roof rack assembly for a motor vehicle, having roof rails that can be secured on the vehicle roof of the vehicle and a load carrier that can be mounted on the roof rails. The invention further relates to a method for operating a controller of a motor vehicle and to a corresponding controller.

The following discussion of related art is provided to assist the reader in understanding the advantages of the invention, and is not to be construed as an admission that this related art is prior art to this invention.

Roof racks of the aforementioned type are known in the art. They are composed of the roof rails, which have at least one, but frequently several, for example two, roof strips which can be fastened on the vehicle roof of the motor vehicle in a parallel arrangement, for example in the longitudinal direction of the vehicle. After initial installation, the roof rails usually remain permanently on the vehicle roof. The roof rails or the roof strips are mounted, for example, with at least one fastening element which penetrates a roof section on which the roof rails at least partially rests, and is connected on its other side with a counter element and/or a roof structure of the motor vehicle. The roof strip of the roof rails is preferably at least partially spaced apart from the vehicle roof, for example by two feet disposed on the roof strips, which provide contact with the vehicle roof. For example, the roof strip is bent such that its two end regions form the feet of the roof strip, whereas a region of the roof strip located between the feet of the roof strip is spaced apart from the vehicle roof.

The roof rack assembly furthermore includes a load carrier which can be mounted on the roof rails. In other words, the load carrier does not have to be permanently installed on the roof rails, but is installed only when, for example, loads are to be transported with the motor vehicle. Accordingly, the load carrier is preferably attached to the roof rails so that it can be manually released by a user. To meet driving-dynamic and safety related requirements, a controller of the vehicle should be operated in a different mode when the load carrier is installed, regardless of whether the load carrier is loaded or not, than when the load carrier is not installed. The first mode already takes into account, for example, a potential roof load of the load carrier itself or of a load placed on the load carrier. For example, the load carrier triggers upon installation a switching device so that its presence can be detected. However, commercially available load carriers can also be installed at locations where the switching device may be unable to detect the presence of the load carrier. Alternatively, the load carrier may be unable to cooperate with the switching device, in particular when using a load carrier that is unauthorized for the motor vehicle. Thus, there is a risk that the controller of the motor vehicle operates in the wrong mode when the load carrier or the entire roof rack assembly is improperly installed.

It would therefore be desirable and advantageous to obviate prior art shortcomings and to provide an improved roof rack assembly for a motor vehicle which ensures a reliable detection of the load carrier on the roof rails and also has a pleasing appearance.

SUMMARY OF THE INVENTION

According to one aspect of the present invention, a roof rack assembly for a motor vehicle includes roof rails constructed to be fastened on a vehicle roof of the motor vehicle, with the roof rails including a recess disposed in the roof rails, a load carrier constructed to be installed on the roof rails, with the load carrier having at least one mounting projection engaging with the roof rails through the recess when the load carrier is installed and cooperating with at least one mounting receptacle for retaining the load carrier, a cover closing the recess when the load carrier is not installed, and a detection device detecting a cover state of the recess.

The mounting projection is provided on the load carrier for fastening the load carrier to the roof rails during installation, wherein the mounting projection extends in the direction of the roof rails or the vehicle roof, respectively, with a corresponding orientation of the load carrier. Conversely, the roof rails have at least one mounting receptacle in which the mounting projection engages when the load carrier is mounted, so that the load carrier is then securely retained on the roof rails. The mounting receptacle is disposed and secured in the roof rails so that the mounting projection must first engage with the roof rails through the receptacle before being able to cooperate with the mounting receptacle for retaining the load carrier.

According to an advantageous feature of the present invention, the mounting receptacle may advantageously be located completely above the vehicle roof, i.e. it is not arranged in a roof seam or in a similar recess in the vehicle roof. In order to achieve particularly pleasing appearance, the cover should be provided which closes the recess when the load carrier is not installed. Preferably, the cover completely closes the recess. In an advantageous embodiment, the recess and the load carrier may additionally be constructed such that the load carrier covers the recess when mounted on the roof rails. Again, complete coverage is preferably provided. The recess of the roof rails can thus advantageously always be closed or covered with a pleasing appearance. At most, outlines of the cover can be recognized when the load carrier is not installed, which however do not adversely affect the overall appearance of the roof rack.

The mounting projection and the mounting receptacle may be advantageously formed, for example, as a threaded bolt and an associated threaded bore, or as an associated threaded insert. The mounting projection may also be in the form of a spherical locking bolt, which is retained on the load carrier. Alternatively, the mounting projection and the mounting receptacle may include bayonet fittings which cooperate with each other during assembly to retain the load carrier on the roof rails. The mounting projection and the mounting receptacle may also have hooking or latching devices. Overall, the mounting projection engages in the mounting receptacle where it is preferably retained by an interlocking connection. This results in a very safe roof rack, because the roof rack is always reliably retained on the vehicle in all driving situations.

With this embodiment, the presence of a load carrier on the roof rails can be reliably detected. For this purpose, not the presence of the roof rack itself, but rather the position of the cover in relation to the mounting receptacle is detected, because it is essential that the cover is opened for mounting the load carrier on the roof rails. Therefore, two distinct states exist that can preferably be detected without making contact and which can subsequently be transmitted, for example, to the controller. When the recess is at least partially closed by the cover, in particular completely closed, the load carrier is certainly not installed on the roof rails. However, the presence of the load carrier to the roof rails is detected when the recess is not closed by the cover, in particular when the recess is fully open. The vehicle can then advantageously still be safely operated even when the cover is damaged or even completely missing. When the recess is not closed by the cover and the load carrier is not mounted on the roof rails, the appearance of the vehicle is impaired. In this case, the driver of the motor vehicle must consciously close the recess with the cover, so that the vehicle can now be operated again in the corresponding operating mode. The cover is preferably constructed such that the recess cannot be closed when the carrier is present on the roof rails. Additionally, the carrier and/or the roof rails may be constructed such that the load carrier can only be placed on the roof rails in a predetermined position.

Overall, the detection device is provided for detecting the cover state of the recess. The cover state shows, for example, whether the recess is closed by the cover, in particular completely closed, or whether the recess is at least partially uncovered by the cover, in particular completely uncovered. This state of the cover may be transmitted to the controller so allow the controller to operate the vehicle in the corresponding operating mode.

According to another advantageous feature of the present invention, the mounting receptacle may be disposed in a fastening element arranged, in particular affixed, in a receptacle of the roof rails. The mounting receptacle is therefore not formed on the roof rails itself, but instead in the fastening element. This fastening element is disposed in the roof rails or in the corresponding receptacle of the roof rails. For example, the receptacle may be designed such that the fastening element is held stationary therein. For this purpose, the shape or dimensions of the receptacle are matched to those of the fastening element. In addition, the fastening element may of course be attached, for example on the roof rails and/or on the vehicle roof, in particular by a releasable connection, preferably as a screw connection. For example, the fastening element may be attached exclusively on the roof rails or exclusively on the vehicle roof. In the latter case, no particular attachment of the fastening element on the roof rails is provided. Alternatively, the mounting receptacle may of course also be formed on or in the roof rails, for example by providing a corresponding bore in an area of the roof rails located below the recess.

According to another advantageous feature of the present invention, the cover may be formed as a flap and pivotally supported on the roof rails and/or the fastening element. The cover should thus be held captive in relation to the roof rails. To this end, the cover is embodied as a flap which is mounted for rotation about a pivot axis, for example on the roof rails. Alternatively, the cover may also be mounted on the fastener, so that the flap is not directly attached to or supported on the roof rails. Rather, the flap is arranged on the fastening element so as to be able to suitably close the recess, after the fastening element and the roof rails have been attached to the roof of the motor vehicle.

According to another advantageous feature of the present invention, the cover has an actuating section that cooperates, when the load carrier is mounted on the roof rails, with an actuating projection of the load carrier to cause the cover to uncover the recess. Such an embodiment is particularly advantageous when the cover is embodied as a flap. In this case, the actuating section can be arranged on one side of the rotation axis such that the flap rotates to uncover the recess when force is applied to the actuating section, wherein the recess is located with respect to the rotation axis, for example, at least partially on a side of the flap opposite the actuating section. The force may be applied, for example, manually by a user of the roof rack assembly. In a particularly advantageous embodiment, however, the load carrier has the actuating projection which comes in contact with the actuating section when the load carrier is mounted such that the recess is automatically uncovered, thus allowing the mounting projection to engage with the now uncovered mounting receptacle.

According to another advantageous feature of the present invention, the detection device may include at least one magnet and at least one magnetic field sensor. This permits an extremely simple and low-wear form the detection device, because the magnetic sensor and the magnetic field typically have no moving parts. For this purpose, the magnetic field sensor—which can be also referred to as a magnetometer—is embodied, for example, as a Hall sensor, XMR sensor or the like. The magnet and the magnetic field sensor are arranged relative to each other so that they can be placed in different relative positions to each other by displacing the cover relative to the recess for closing or uncovering the recess. For example, the magnet is arranged closer to the magnetic field sensor when the cover is in a position for closing the cover (closed position) than when the recess is uncovered (open position). It can now be determined with the magnetic field sensor whether the magnet is located in close proximity, indicating the position of the cover in relation to the recess.

According to another advantageous feature of the present invention, the magnet may exert a closing force on the cover at least when the cover is in a closed position. In other words, a magnetic force of the magnet urges the cover into its closed position in which it closes, in particular completely closes the recess. Thus, with a suitable design of the magnet, no other means are required for retaining the cover in its closed position. Specifically, the magnetic force must be sufficiently large and the cover must at least partially be made of a magnetizable material, so that it is attracted by the magnet.

According to another advantageous feature of the present invention, the magnet may be attached to the cover, and the magnetic field sensor may be attached on the roof rails or on the fastening element having the mounting receptacle. The magnet and the magnetic field sensor are mutually displaceable in such an embodiment. Of course, the reverse arrangement may also be selected wherein the magnet is attached on the roof rails or the fastening element and the magnetic field sensor is attached to the cover.

According to another advantageous feature of the present invention, the magnet and the magnetic field sensor may be attached to the roof rails or to the fastening element, and the cover may have a magnetic yoke enabling a magnetic flux between the magnet and the magnetic sensor in the closed position of the cover. Alternative to the embodiment where the magnet and magnetic field sensor are displaced relative to each other, an embodiment can be selected where only the magnetic flux between the magnet and the magnetic sensor is affected by the different arrangements of the cover. Accordingly, both the magnet and the magnetic sensor may be arranged on the roof rails or on the fastening element, without being movable relative to one another. The cover has here the magnetic yoke or forms the magnetic yoke. The magnetic yoke is made of a magnetizable material which transmits the magnetic flux between the magnet and the magnetic field sensor at least when the cover is in the closed position. When the cover is removed from the recess, for example when the flap is opened, the position of the magnetic yoke changes, thus changing, in particular reducing the magnetic flux between the magnet and the magnetic sensor. This is detected by the magnetic sensor, thereby detecting the removal of the cover from the recess, or the displacement of the cover into the open position. Advantageously, the magnetic yoke serves as a magnetic element, on which the magnet exerts the aforedescribed closing force.

According to another advantageous feature of the present invention, the fastening element rests on the vehicle roof after the roof rails have been mounted on the roof rails. The fastening element is hence supported on the vehicle roof in order to dissipate to the vehicle roof the forces applied via the load carrier. For example, the fastening element is arranged on the roof rails so that it automatically rests on the vehicle roof after attachment of the roof rails. Alternatively, the fastening element may be initially arranged on and/or attached to the vehicle roof, whereafter the roof rails is arranged on and/or attached to the vehicle roof, wherein the fastening element comes to rest in the receptacle of the roof rails.

Alternatively or in addition, the fastening element may advantageously be connected to the vehicle roof only via the roof rails, after the roof rails is attached to the vehicle roof. Alternatively, the roof rails may be attached only to the vehicle roof and the fastening element may be attached only to the roof rails. Accordingly, there is no direct connection or direct contact between the fastening element and the vehicle roof. Accordingly, the forces generated by the load carrier are dissipated into the roof rails and subsequently into the vehicle roof only via the fastening element. For example, in this embodiment, the fastening element is spaced apart from the vehicle roof in the vertical direction, so that the mounting receptacle is also located above the vehicle roof. Accordingly, the fastening element may be located for example in an area of the roof rails, in which the roof rails do not abut the vehicle roof, but rather are spaced from the vehicle roof.

According to another advantageous feature of the present invention, the load carrier may be attached to the roof rails only via the at least one fastening element. No additional fastening means in addition to the fastening element are provided to retain the load carrier on the roof rails. In particular, no additional frictional or interlocking connection elements, such as profile lugs or the like, are required for attaching the load carrier. The roof rails can then be formed as an extruded profile. In addition, the appearance is significantly improved by eliminating the profile lugs and similar elements. It will, however, be understood that the load carrier may have at least one support section for supporting the load carrier in a corresponding counter support region of the roof rails after installation. The expression "mounting of the load carrier on the roof rails" refers hereby preferably only to the retention in the directions substantially perpendicular to the gravity vector, i.e. in particular in the longitudinal direction and in the lateral direction. Retention or support in the vertical direction, i.e. in the direction of the roof rails, is thus preferably achieved with both the fastening element and the combination of support region and counter support region.

According to another advantageous feature of the present invention, a drain line may be provided, which is opens with one side into the mounting receptacle and is connected with the other side to a surrounding area of roof rack for draining fluid from the mounting receptacle. In spite of the cover, or the arrangement of the load carrier above the recess or the mounting receptacle, moisture, in particular rain or the like, may be able to enter the mounting receptacle. This can impair the function of the detection device. The moisture should therefore be removed from the mounting receptacle as quickly as possible. To this end, the drain line is provided, which is fluidly connected to the mounting receptacle, preferably at an end of the mounting receptacle facing the vehicle roof, provided that this end is terminated above the vehicle roof. Accordingly, no moisture can accumulate in the mounting receptacle. The drain line is routed from the mounting receptacle toward the area around the roof rack and is inclined so as to ensure a reliable removal of the moisture assisted by gravity when the ground underneath the motor vehicle is sloped.

Finally, the drain line may open with its side facing away from the mounting receptacle into a drain opening in the roof rails, which is formed in particular by an open-edged recess of the roof rails on its side facing the vehicle roof. The drain line is thus disposed, for example, only in the fastening element and opens into a side surface of the fastening element for removal of the moisture. The drain opening is provided in the roof rails so as to be able to remove the moisture to the surroundings. Thus, the moisture passes from the mounting receptacle into the drain line and from there via the drain opening into the surroundings of the roof rack. The drain opening may be an opening that is closed, for example, along an edge, in particular a bore or the like. In a particularly preferred embodiment, however, the drain opening is an open-edged recess of the roof rails. To this end, the drain opening passes through a side of the roof rails facing the vehicle roof. Such an embodiment can be particularly easily manufactured and also has a pleasing appearance because the recess is hardly noticeable in the area of the vehicle roof.

The invention further relates to a method for operating a controller of a motor vehicle with a roof rack assembly, in particular in accordance with the foregoing embodiments, wherein the roof rack assembly includes roof rails that can be attached on a vehicle roof of the motor vehicle and a load carrier mounted on the roof rails. The load carrier may have at least one mounting projection, which engages during the installation of the load carrier on the roof rails with the roof rails through a recess of the roof rails and cooperates with at least one mounting receptacle for retaining the load carrier. The recess should be closable with a cover when the load carrier is installed, and a cover state of the recess should be ascertainable by a detection device. Furthermore, the controller should operate at least one device of the motor vehicle in a first operating mode when the recess is closed and in a second operating mode when the recess is at least partially open. The device is, for example, a driver assistance device, i.e. in particular an ESP device or the like. The advantages of such a procedure has have already been pointed out at the outset, so that reference is made here to the foregoing discussion.

The invention furthermore relates to a controller of a motor vehicle with a roof rack assembly, which is constructed in accordance with the above description. The controller is configured to operate at least one device of the motor vehicle in a first operating mode when the recess is closed, and in a second operating mode when the recess is at least partially open. The method and the roof rack assembly may of course also include improvements over the aforedescribed embodiments.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
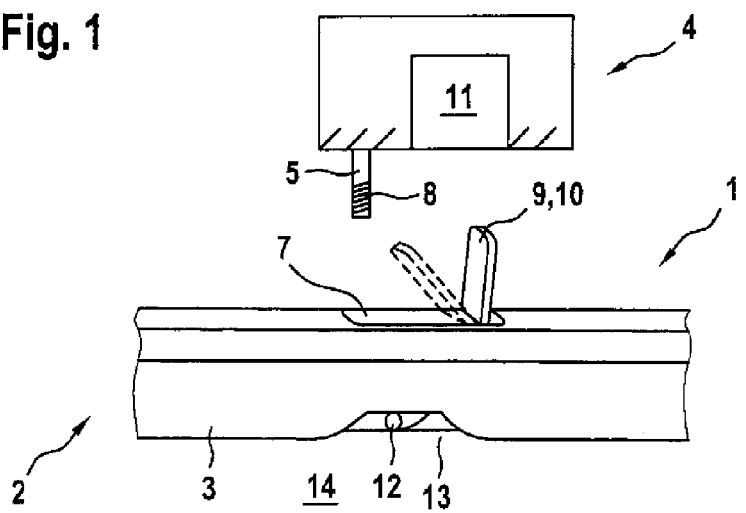
FIG. 1 shows a schematic diagram of the roof rack assembly according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a side view of a roof rack assembly 1 for a motor vehicle. The roof rack assembly 1 is composed of roof rails 2 with at least one roof strip 3 and a load carrier 4 (shown only schematically). The roof rails 2 (not shown here) can be fastened or are fastened on the vehicle roof. The roof strip 3 associated with the roof rails 2 rests, for example, over its entire length on the roof. However, the roof strip 3 may also be in contact with the vehicle roof by way of at least two feet of the roof strip. The feet of the roof strip are, for example, arranged at the free ends of the roof strip 3. The roof strip may be spaced from the vehicle roof between the feet of the roof strip. In the present exemplary embodiment, the roof strip 3 is shown as resting on the vehicle roof along its entire length. Preferably, the roof rails 2 are permanently attached to the vehicle roof, whereas the load carrier 4 is mounted on the roof rails 2 only when necessary. For example, there are two mutually parallel roof strips 3 extending in the longitudinal direction of the vehicle across the vehicle roof.

The load carrier 4 is preferably configured to directly receive loads, or is at least connected or connectable to a corresponding receiving device. The load carrier 4 is composed, for example, of at least one crossbar which can be arranged on the roof strip(s) 3. The load carrier 4 has at least one mounting projection 5, which cooperates with a mounting receptacle 6 (not visible) of roof rails 2 to retain the load carrier 4 on the roof rails 2. When installing the load carrier 4 on the roof rails 2, the mounting projection 5 extends through a recess 7 of the roof rails 2 and can subsequently engage with the mounting receptacle 6 arranged in the roof rails 2 or the roof strip 3. The mounting projection 5 is implemented, for example, as a threaded bolt, i.e. has a thread 8, which can cooperate with a mating thread of the mounting receptacle 6 to retain the load carrier 4.

To close the recess 7, when the load carrier 4 is not mounted on the roof rails 2, a cover 9 is provided, which is indicated here in two different positions. The cover 9 is constructed so as to completely close the recess 7 when the load carrier 4 is not installed. In particular, an outer contour of the cover 9 substantially corresponds to an inner contour of the recess 7. Conversely, when the load carrier 4 is installed, the cover 9 uncovers the recess 7 so that the mounting projection 5 can pass through the recess 7 to the mounting receptacle 6. The load carrier 4 should hereby be arranged so as to preferably completely cover the recess 7 in the installed state; to this end, the load carrier 4 is suitably dimensioned.

In the present embodiment, the cover 9 is constructed as a flap 10 which is pivotally mounted about a pivot axis with respect to the roof rails 2. The cover 9 is thus held captive on the roof rails 2. Accordingly, the load carrier 4 has a cavity 11 in which the flap 10 at least partially engages after the load carrier 4 has been installed on the roof rails 2. According to a particularly preferred embodiment, the cover 9 and the flap 10, respectively, may have an actuating region (not visible here). In the illustrated diagram, this actuating region is located to the right of the rotation axis of the flap 10. When a force is applied to this actuating region in the direction of the vehicle roof, the flap 10 experiences a torque which causes the flap 10 to be pivoted so as to uncover the recess 7. Additionally, the load carrier 4 may have an actuating projection which cooperates with the actuating region so as to uncover the recess 7 when the load carrier 4 is installed on the roof rails 2. Subsequently, the mounting projection 5 can pass through the recess 7 and the flap 10 can at least partially enter the cavity 11.

Also recognizable is an area of a drain line 12, which extends from the mounting receptacle 6 to a drain hole 13 of the roof rails 2 or the roof strip 3, respectively. Moisture can be removed from the mounting receptacle 6 through this drain line 12 in the direction of a surrounding area 14 of the roof rack 1. The drain hole 13 in the roof rails 2 has an open edge so that a side of the roof rails 2 facing the vehicle roof is penetrated. The moisture can hence be drained without impairing the visual appearance.

Figure 2:
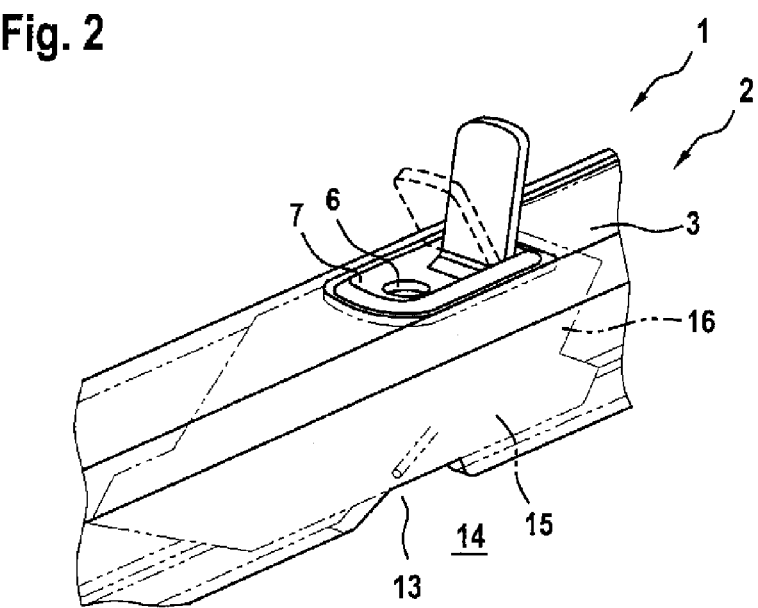
FIG. 2 shows a detailed view of an area of roof rails of the roof rack assembly, wherein one fastening element is visible.

FIG. 2 shows a detailed view of an area of the roof rails 2. As can be seen, the mounting receptacle 6 is disposed in a fastening element 15 arranged inside the roof rails 3. In the illustrated embodiment, the fastening element 15 rests on the vehicle roof, i.e. is supported thereon. In addition, the fastening element 15 can be connected to the vehicle roof by, for example, a screw connection. The fastening element 15 is thus disposed in a receptacle 16 of the roof rails 2. In a particularly preferred embodiment, the cover 9 and the flap 10, respectively, is supported on the fastening element 15, i.e. not directly on the roof rails 2. This allows a particularly simple and inexpensive manufacture of the roof rails 2.

Figure 3:
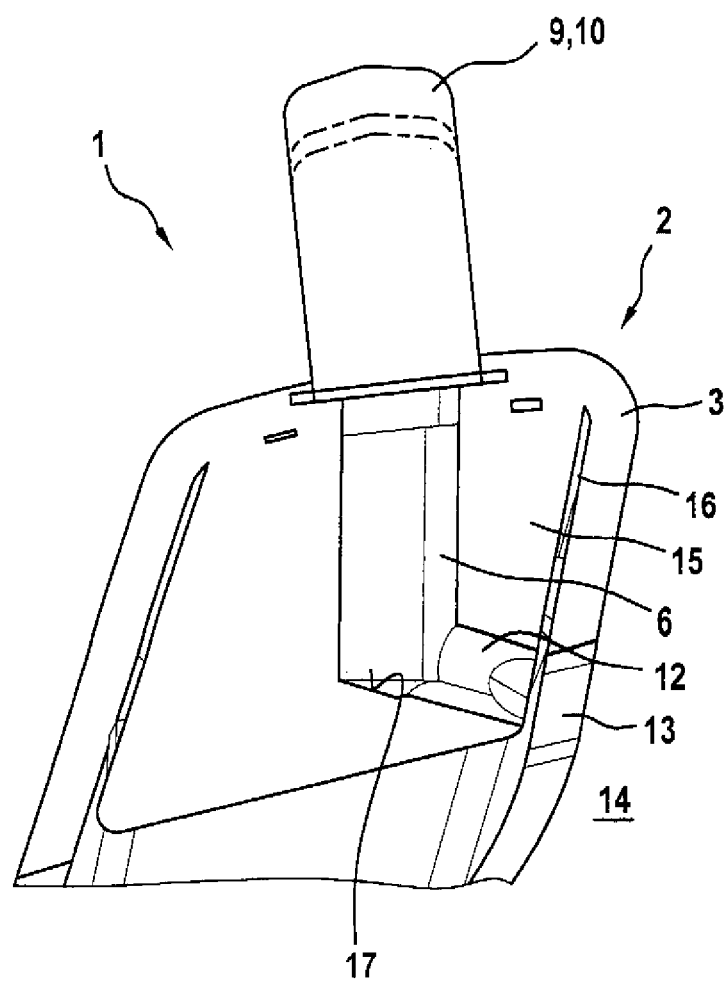
FIG. 3 shows a detailed sectional view of the roof rails and the fastening element.

FIG. 3 shows a more detailed view of the roof rails 2 and the fastening element 15. As can be clearly seen, the mounting receptacle 6 is present only in the fastening element 15 and may, for example, be implemented, as shown here, as a blind hole, i.e. may not completely pass through the fastening element 15 in the direction of the vehicle roof. In particular, the mounting receptacle 6 is located completely above the vehicle roof or vertically spaced apart from the vehicle roof. Alternatively, the fastening element 15 may not extend up to the vehicle roof, but may instead only be attached to vehicle roof by way of the roof rails 2. The drain line 12, which opens into the mounting receptacle 6 at a bottom 17 of the mounting receptacle 6, can be clearly seen in the selected diagram. Accordingly, moisture cannot accumulate in the mounting receptacle 6. The drain line 12 slopes from the mounting receptacle 6 to the drain recess 13 to ensure reliable removal of the moisture from the mounting receptacle 6 even for expected inclination angles of the ground underneath the vehicle.

Figure 4:
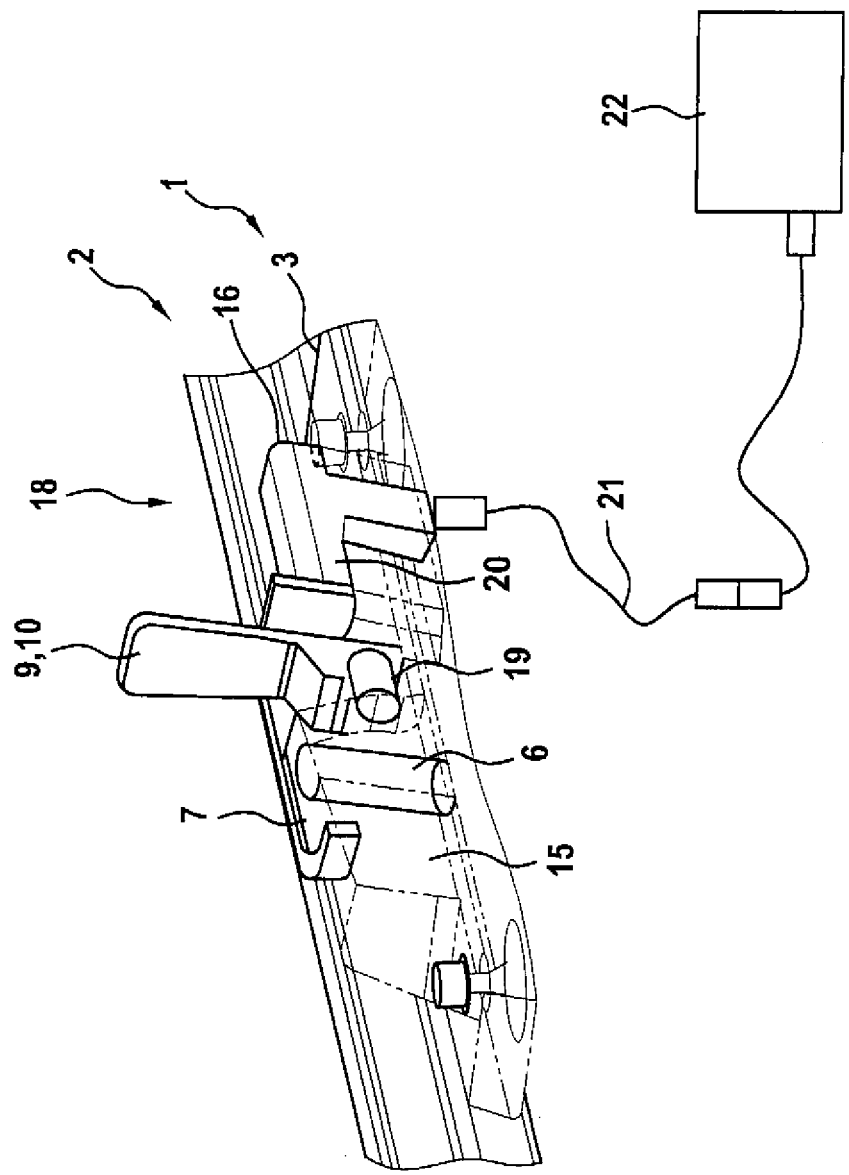
FIG. 4 shows a view of an area of the roof rack assembly with a detection device in a first embodiment according to the present invention.

FIG. 4 shows an area of the roof rack assembly 1 with a detection device 18 for detecting a cover state of the recess 7 in a first embodiment. The detection device 18 is composed of at least a magnet 19 and a magnetic field sensor 20. The latter may be, for example, a Hall sensor. The magnet 19 is disposed on the cover 9 or the flap 10, respectively, and can be displaced together with the cover/flap. Conversely, the magnetic field sensor 20 is stationary in the roof rails 2 and is advantageously located in the attachment element 15. The magnetic field sensor 20 is, for example, connected via a line 21 to a controller 22. The cover state of the recess 7 can be detected using the detection device 18. In the illustrated embodiment, the magnetic field generated by the magnet 19 is detected by the magnetic field sensor 20. When the cover 9 is closed, the magnet 19 is located closer to the magnetic sensor 20 than when the cover 9 has been opened or removed. Accordingly, the magnetic field detected with the magnetic field sensor 20 is in the former case stronger than in the latter case. Therefore, a conclusion can be drawn based on the strength of the magnetic field on whether the recess 7 is closed by the cover 9 or whether the recess 7 is uncovered.

The signal generated by the magnetic field sensor 20 commensurate with the magnetic field is evaluated by the controller 22. The controller 22 now operates at least one device of the motor vehicle in a first operating mode when the recess 7 is closed and in a second operating mode when the recess 7 is at least partially open. The device is, for example, a driver assistance device, especially an ESP device. When the recess 7 is closed, i.e. when the cover 9 closes the recess 7, the first operating mode is selected, wherein driving parameters of the vehicle are selected without considering the load support 4. Conversely, in the second operating mode, the device is controlled as if the load carrier 4 was present, and more particularly would be loaded. Accordingly, a very safe driving behavior of the vehicle is achieved in both operating modes. In a particularly advantageous embodiment, a magnetizable element may be provided on the roof strip 3 which is arranged so that the magnet 19 is located closest to the magnetizable element when the cover 9 is in the closed position. Accordingly, the magnet 19 may apply in the closed position to the cover 9 a closing force, which must be initially overcome for uncovering the recess 7.

Figure 5:
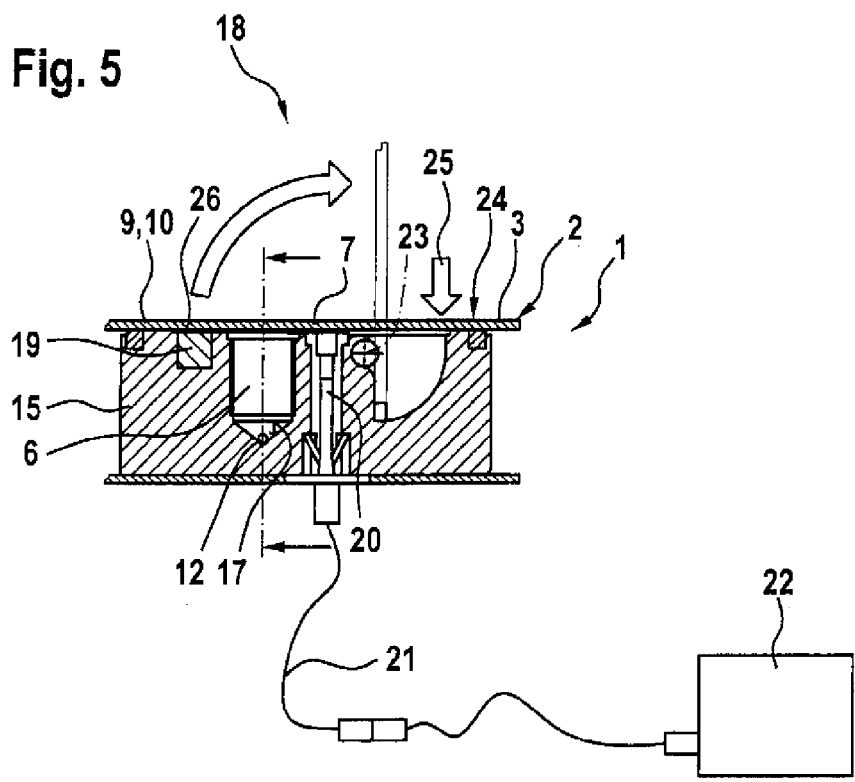
FIG. 5 shows a view of the area of the roof rack assembly with the detection device in a second embodiment according to the present invention.

FIG. 5 shows an area of the roof rack assembly 1 with a detection device 18 in a second embodiment. This diagram shows again clearly that the flap 10 can be pivoted about a pivot axis 23 and has an actuation region 24 wherein the recess 7 is uncovered when the actuation region 24 is operated. Actuation occurs through application of a force in the direction of the arrow 25. The cover 9 and the flap 10, respectively, are again shown in two different positions, namely in a closed position (solid lines) and in an open position (dotted lines). The difference from the embodiment described with reference to FIG. 4 lies in the fact that both the magnet 19 and the magnetic field sensor 20 are arranged on the fastening element 15. Conversely, the cover 9 includes a magnetic yoke 26 used to transmit, when the cover 9 is in the closed position, a magnetic flux between the magnet 19 and the magnetic sensor 20. Conversely, when the cover 9 is removed or moved into the open position, the magnetic flux is at least reduced or even interrupted altogether. Accordingly, a conclusion of whether the recess 7 is closed by the cover 9 or uncovered can be drawn based on the strength of the magnetic field detected by the magnetic sensor 20. The controller 22 again evaluates the corresponding signals from the magnetic field sensor 20.

Figure 6:
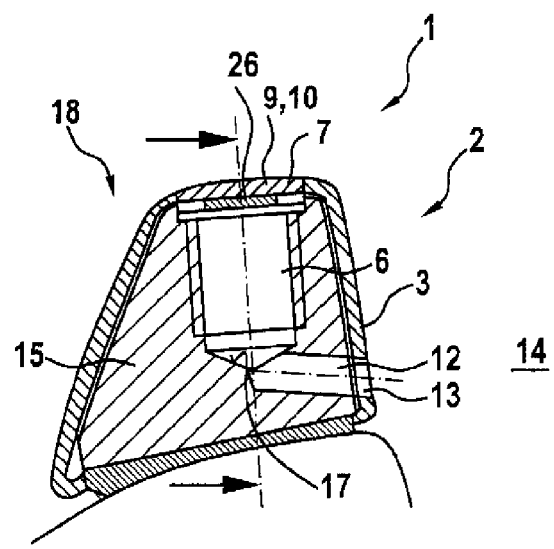
FIG. 6 shows a cross section through the area of the roof rack assembly shown in FIG. 5.

FIG. 6 shows a cross sectional view of the area of the roof rack assembly 1 described previously with reference to FIG. 5. As can be seen, the drain line 12 and the drain recess 13 are also included here. In this way, the detection device 8 is not adversely affected by the moisture in the mounting recess 6.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A roof rack assembly for a motor vehicle, comprising:
   roof rails constructed to be fastened onto a vehicle roof of the motor vehicle, with the roof rails comprising a recess disposed in the roof rails,
   a load carrier constructed to be installed on the roof rails, with the load carrier having at least one mounting projection engaging with the roof rails through the recess when the load carrier is installed and cooperating with at least one mounting receptacle for retaining the load carrier,
   a cover closing the recess when the load carrier is not installed, and
   a detection device comprising at least one magnet and at least one magnetic field sensor and configured to detect a cover state of the recess based on a magnetic flux between the at least one magnet and the at least one magnetic field sensor.

2. The roof rack assembly of claim 1, wherein the at least one mounting receptacle is disposed in a fastening element which is arranged in a receptacle of the roof rails.

3. The roof rack assembly of claim 2, wherein the fastening element is attached to the receptacle of the roof rails.

4. The roof rack assembly of claim 2, wherein the cover is constructed as a flap and is pivotally supported on the fastening element.

5. The roof rack assembly of claim 1, wherein the cover is constructed as a flap and is pivotally supported on the roof rails.

6. The roof rack assembly of claim 1, wherein the cover comprises an actuation area that cooperates, when the load carrier is installed on the roof rails, with an actuating projection of the load carrier for causing the cover to uncover the recess.

7. The roof rack assembly of claim 1, wherein the at least one magnet applies a closing force on the cover at least in a closed position of the cover.

8. The roof rack assembly of claim 1, wherein the at least one magnet is attached to the cover and the at least one magnetic field sensor is attached to the roof rails or to a fastening element having the at least one mounting receptacle.

9. The roof rack assembly of claim 1, wherein the at least one magnet and the at least one magnetic field sensor are attached to the roof rails or to a fastening element having the at least one mounting receptacle, and wherein the cover comprises a magnetic yoke producing in a closed position of the cover a magnetic flux between the at least one magnet and the at least one magnetic field sensor.

10. The roof rack assembly of claim 1, wherein the detection device is configured to cause a controller of the motor vehicle, based on the cover state of the recess, to operate at least one device of the motor vehicle in a first operating mode when the recess is closed and the load carrier is not installed, and to operate the at least one device of the motor vehicle in a second operating mode when the recess is at least partially open.

11. A method of operating a controller of a motor vehicle, wherein the motor vehicle has a roof rack assembly with roof rails that can be attached on a vehicle roof of the motor vehicle and a load carrier that can be installed on the roof rails, with the load carrier having at least one mounting projection engaging with the roof rails through a recess when the load carrier is installed and cooperating with at least one mounting receptacle for retaining the load carrier, the method comprising:

detecting with a detection device comprising at least one magnet and at least one magnetic field sensor a cover state of the recess based on a magnetic flux between the at least one magnet and the at least one magnetic field sensor, indicating whether the recess is closed by a cover, and operating at least one device of the motor vehicle with a controller in a first operating mode when the recess is closed and the load carrier is not installed, and operating the at least one device of the motor vehicle in a second operating mode when the recess is at least a partially open.

12. A controller for a motor vehicle having a roof rack assembly comprising roof rails constructed to be fastened on a vehicle roof of the motor vehicle, with the roof rails comprising a recess disposed in the roof rails, a load carrier constructed to be installed on the roof rails, with the load carrier having at least one mounting projection engaging with the roof rails through the recess when the load carrier is installed and cooperating with at least one mounting receptacle for retaining the load carrier, a cover closing the recess when the load carrier is not installed, and a detection device comprising at least one magnet and at least one magnetic field sensor and configured to detect a cover state of the recess based on a magnetic flux between the at least one magnet and the at least one magnetic field sensor indicating whether the recess is closed by a cover, wherein the controller operates at least one device of the motor vehicle in a first operating mode when the recess is closed and the load carrier is not installed, and operates the at least one device of the motor vehicle in a second operating mode when the recess is at least a partially open.

* * * * *